US012749733B2

(12) United States Patent
Wang et al.

(10) Patent No.: US 12,749,733 B2
(45) Date of Patent: Sep. 29, 2026

(54) TEMPERATURE SENSITIVE COATINGS

(71) Applicant: UT-Battelle, LLC, Oak Ridge, TN (US)

(72) Inventors: Hsin Wang, Oak Ridge, TN (US); Beth L. Armstrong, Oak Ridge, TN (US); Mary K. Burdette-Trofimov, Oak Ridge, TN (US); Chanaka Ihala Gamaralalage, Oak Ridge, TN (US)

(73) Assignee: UT-BATTELLE, LLC, Oak Ridge, TN (US)

(*) Notice: Subject to any disclaimer, the term of this patent is extended or adjusted under 35 U.S.C. 154(b) by 687 days.

(21) Appl. No.: 18/119,373

(22) Filed: Mar. 9, 2023

(65) Prior Publication Data

US 2023/0299385 A1 Sep. 21, 2023

Related U.S. Application Data

(60) Provisional application No. 63/319,816, filed on Mar. 15, 2022.

(51) Int. Cl.
*H01M 10/6551* (2014.01)
*H01M 10/48* (2006.01)
*H01M 10/63* (2014.01)
*H01M 10/6595* (2014.01)

(52) U.S. Cl.
CPC ....... *H01M 10/6551* (2015.04); *H01M 10/48* (2013.01); *H01M 10/63* (2015.04); *H01M 10/6595* (2015.04)

(58) Field of Classification Search
CPC .. H01M 10/48; H01M 10/63; H01M 10/6551; H01M 10/6595
See application file for complete search history.

(56) References Cited

U.S. PATENT DOCUMENTS

| | | | | |
|---|---|---|---|---|
| 2001/0044014 A1* | 11/2001 | Miyata | C09D 11/50 | |
| | | | 524/81 | |
| 2020/0112016 A1* | 4/2020 | Erhart | H01M 50/209 | |
| 2020/0273308 A1* | 8/2020 | Hung | G08B 17/12 | |

* cited by examiner

*Primary Examiner* — Victoria H Lynch
(74) *Attorney, Agent, or Firm* — WARNER NORCROSS + JUDD LLP

(57) ABSTRACT

A temperature sensitive coating for application on a surface is provided. The temperature sensitive coating comprises an indicator component. The indicator component includes a carrier and a releasable compound that is held by the carrier. The releasable compound is in a gas state at a critical release temperature, and is released from the carrier at a temperature that is at or above the critical release temperature. A method of coating a surface of an energy storage system, and a method of detecting the approach of thermal runaway of an energy storage system, are also provided. The method includes coating a surface with the temperature sensitive coating, providing a gas sensor in the vicinity of the surface that is capable of detecting the presence of the releasable compound, monitoring the output of the sensor, and signaling an alarm when the sensor output indicates the presence of the releasable compound.

20 Claims, 10 Drawing Sheets

TEMPERATURE SENSITIVE COATINGS

CROSS-REFERENCE TO RELATED APPLICATIONS

This application claims the benefit of U.S. Provisional Application No. 63/319,816, filed Mar. 15, 2022, the disclosure of which is incorporated by reference in its entirety.

STATEMENT REGARDING FEDERALLY SPONSORED RESEARCH AND DEVELOPMENT

This invention was made with government support under Contract No. DE-AC05-000R22725 awarded by the U.S. Department of Energy. The government has certain rights in the invention.

FIELD OF THE INVENTION

The present invention relates to temperature sensitive coatings for detection of overheating which can lead to thermal runaway in energy storage systems and other applications.

BACKGROUND OF THE INVENTION

Lithium-ion batteries used in energy storage systems and electrical vehicles have safety concerns due to the large amount of stored energy and their potential to go to thermal runaway. Such an event can be triggered by overheating of the batteries, overcharging, over discharging, mechanical damage, and/or manufacturing defects. Although it is possible to continuously monitor battery cell temperature, it is simply not practical from a cost, space, and resource perspective to connect every single cell in a battery pack to temperature sensors. Also, each temperature sensor typically measures at a single point and therefore does not always provide an accurate reading of the temperature of all areas of the cell. As an alternative to temperature sensors, gas sensors have been developed to detect gas release at the onset of battery thermal runaway due to a breach of the cell containment. However, such detection is often too late to prevent thermal runaway before it occurs. Optical sensors/cameras are yet another alternative, but such sensors require a clear line of sight which is not always possible or practical. Therefore, a need exists for an early warning mechanism to detect and warn of the onset of thermal runaway conditions. Such a warning mechanism could also be utilized in other applications to detect an increase in temperature.

SUMMARY OF THE INVENTION

A temperature sensitive coating for application on a surface is provided. The temperature sensitive coating comprises an indicator component. The indicator component includes a carrier and a releasable compound that is held by the carrier. The releasable compound is in a gas state at a critical release temperature, and is released from the carrier at a temperature that is at or above the critical release temperature.

In specific embodiments, the indicator component is one of an organometallic compound or an organic compound in which the releasable compound is bonded to the carrier.

In particular embodiments, the indicator component has the chemical formula $M_x(S—R)_y$, in which M is the carrier and represents a transition metal, R represents a hydrocarbon, and S—R or its by-products is the releasable compound.

In particular embodiments, the bond is broken at the critical release temperature to release the releasable compound.

In specific embodiments, the carrier includes a block co-polymer in which the releasable compound is sequestered in a hydrophobic domain of the block co-polymer.

In specific embodiments, the releasable compound is one selected from a group consisting of a sulfur-containing compound, an aliphatic thiol, an aromatic thiol, mercaptan, an alcohol, a ketone, and ammonia.

In specific embodiments, the temperature sensitive coating includes a vehicle.

In particular embodiments, the vehicle is a solvent.

In specific embodiments, the temperature sensitive coating includes a plurality of different indicator components.

In specific embodiments, the critical release temperature is in the range of 60° C. to 140° C.

A method of coating a surface of an energy storage system includes providing the temperature sensitive coating, and applying the temperature sensitive coating to an outer surface of the energy storage system.

In specific embodiments, the temperature sensitive coating is applied to one of: (i) an entire outer surface of the energy storage system; and (ii) only to targeted areas of the outer surface of the energy storage system.

In specific embodiments, the method further includes the step of applying a protective layer over the temperature sensitive coating.

In specific embodiments, the temperature sensitive coating is applied at one of: (i) during fabrication of the energy storage system; or (ii) after fabrication of energy storage system.

A method of detecting the approach of thermal runaway of an energy storage system is also provided. The method includes coating a surface of the energy storage system with the temperature sensitive coating. The method further includes providing a gas sensor in the vicinity of the energy storage system, the gas sensor being capable of detecting the presence of the releasable compound. The method further includes monitoring an output of the gas sensor. The method further includes signaling an alarm when the gas sensor output indicates the presence of the releasable compound. The signaling of the alarm indicates that the energy storage system has reached the critical release temperature.

In specific embodiments, the energy storage system includes a battery cell.

In specific embodiments, the step of coating the surface of the energy storage system is performed at one of: (i) during fabrication of the energy storage system; or (ii) after fabrication of energy storage system.

In specific embodiments, the method further includes the step of overcoating the temperature sensitive coating with a protective layer.

In particular embodiments, the protective layer is a paint.

In specific embodiments, the temperature sensitive coating changes color at the critical release temperature, and a location of the change in color of the coating indicates an area of elevated temperature that is at or above the critical release temperature.

These and other features of the invention will be more fully understood and appreciated by reference to the description of the embodiments and the drawings.

DETAILED DESCRIPTION OF THE CURRENT EMBODIMENTS

Figure 1:
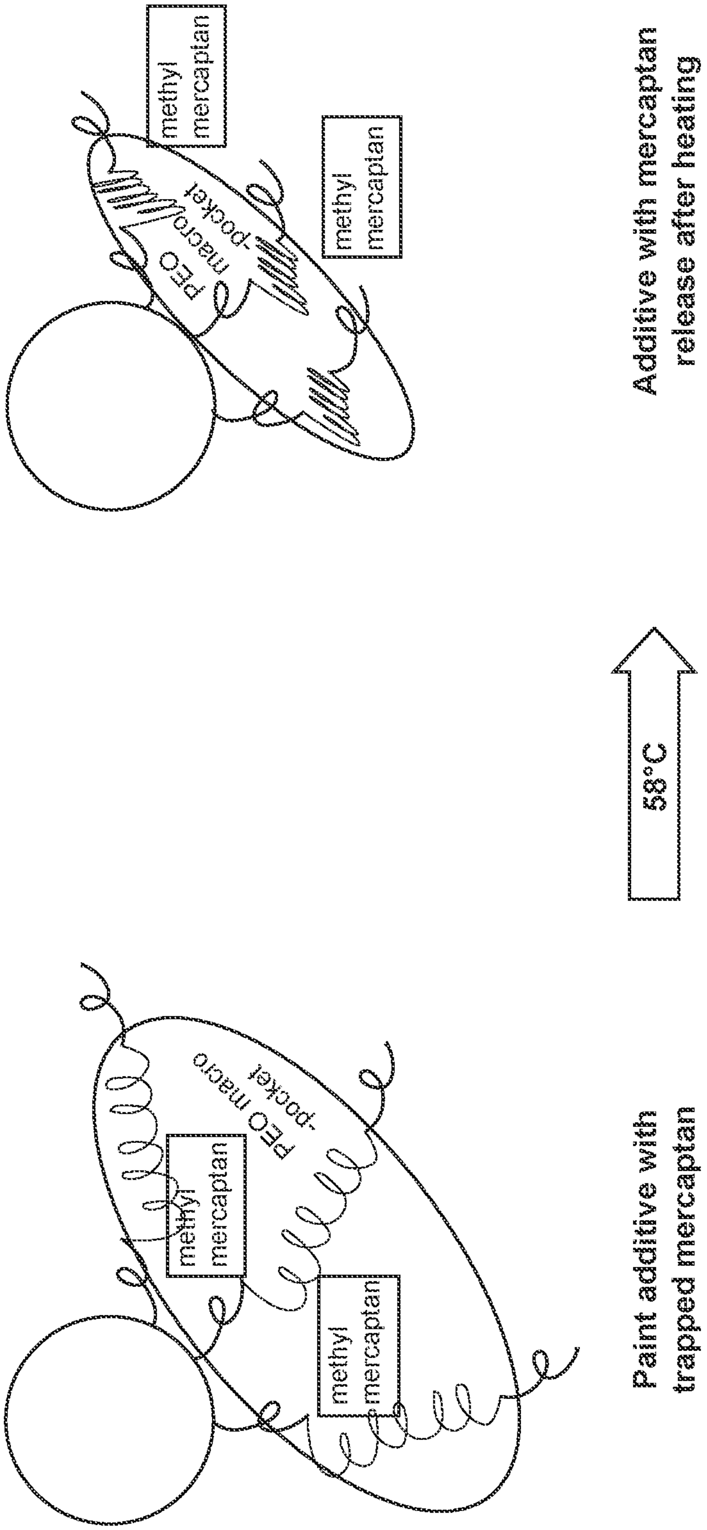
FIG. 1 is a schematic illustration of a temperature sensitive coating including a releasable compound sequestered by a block co-polymer and released upon heating in accordance with some embodiments of the disclosure.

As discussed herein, the current embodiments relate to a temperature sensitive coating composition and a method of detecting an increase in system temperature such as the approach of thermal runaway in an energy storage system. The temperature sensitive coating composition can be applied to a surface such as the surface of an energy storage system, i.e. an outer surface of a battery cell, or any other system that can benefit from temperature monitoring/warning such as electronic equipment, power stations, engines, furnaces, and even reactors. The temperature sensitive coating composition includes a releasable chemical compound that is released as a gas from the applied coating composition when the coating reaches a predetermined critical release temperature that is below a thermal runaway temperature or other harmful or dangerous temperature. A sensor positioned near the applied coating composition can detect the presence of the released compound (e.g., detect a ppm level of the released compound in air) and trigger the sending of a warning signal to indicate that a critical temperature has been reached. Also, the released compound may be odorous, thereby providing an olfactory warning. Additionally, the applied coating composition may undergo a color change at the critical temperature, thereby providing a visual warning. The temperature sensitive coating composition and method of detection provide battery and other thermal management systems ample time to reduce the potential risks of dangerous rises in temperature and to prevent catastrophic events from occurring.

More particularly, the temperature sensitive coating composition includes an indicator component that includes a carrier and a releasable compound. The releasable compound is held by the carrier at temperatures that are less than the predetermined critical release temperature. In some embodiments, the releasable compound is tethered to the carrier such that the releasable compound is chemically bonded to the carrier, for example covalent bonds and particularly metal-thiol bonds. In other embodiments, the releasable compound is sequestered by the carrier such that the releasable compound is encapsulated by and/or within an area occupied and surrounded by the carrier. In certain embodiments, the carrier may have an encapsulation region that collapses with increasing temperature and squeezes the releasable compound out of the encapsulation region. The critical release temperature is determined based on the specific application of the temperature sensitive coating and is influenced by the choice of the releasable compound and the type of carrier. For example, as discussed in greater detail below, for lithium-ion battery applications the critical release temperature is less than or equal to approximately 120° C., optionally between 40° C. and 100° C., and optionally between 60° C. and 80° C. These temperature ranges are particular to temperatures at which a lithium-ion battery approaches a thermal runaway condition. However, for other overheating applications such as electric power applications (e.g., circuit breakers) or furnaces, the critical release temperature ranges may be different, such as up to 140° C., optionally between 60° C. and 140° C.

The indicator component may be an organometallic compound or an organic compound in which the releasable compound is bonded to the carrier. For example, the indicator component may be a thermal-sensitive thiolated organometallic compound having the general chemical formula $M_x(S—R)_y$, in which M is the carrier and represents a transition metal such as but not limited to Cu, Zn, Pd, Ag, Cd, Pt, Au, and the like, S—R (or its by-products after thermal decomposition of the indicator component) is the releasable compound in which S is the chemical element sulfur and R represents a hydrocarbon, and x and y are integers. The hydrocarbon R may be, for example, an alkyl group that is a short straight chain hydrocarbon such as a methyl group ($—CH_3$) or an ethyl group ($—CH_2CH_3$), or a longer hydrocarbon chain such as a dodecyl group ($—(CH_2)_{11}CH_3$) or larger, for example up to C18 (boiling point of 210° C.), optionally up to C20. The alkyl group may also be a branched hydrocarbon group. Alternatively, the hydrocarbon may be an aryl group. The length and size of the alkyl group influences the critical release temperature, whereby increasing the length of the alkyl chain generally increases the critical release temperature of the releasable compound. The values of x and y are dependent upon the transition metal M and its oxidation state(s) in combination with the coordination number of the metal. For example, when the transition metal M is Cu, x=1 and y=2 such that the formula becomes $Cu(SR)_2$. Generally, x may be 1, 2, 3, or 4 and y also may be 1, 2, 3, or 4. The choice of transition metal also influences the critical release temperature. Metals that exhibit strong metal-thiol interaction may have higher critical release temperatures than those metals that have weaker metal-thiol interactions. In certain embodiments, the indicator component is a thiolated copper compound having the formula $Cu_x(SCH_2CH_3)_y$ in which the carrier metal is copper (Cu), the releasable compound is ethane thiol, x=1, and y=2. This indicator component has a critical release temperature of around 70° C.±5° C. In these embodiments, the releasable compound is a sulfur-containing compound, particularly an aliphatic thiol. However, it should be understood that the releasable compound may be another aliphatic thiol such as mercaptan (methane thiol), an aromatic thiol, other sulfur-containing compounds, an alcohol, a ketone, or ammonia. As such, the releasable compound is preferably an odorous compound that can be sensed by smell. However, the releasable compound does not need to have an odor, and simply needs to be a compound whose airborne (gaseous) concentration, such as in parts per million (ppm), is capable of detection by a sensor.

As described in greater detail in the examples below, in the case that the indicator component is a thermal-sensitive thiolated copper compound such as copper ethanethiol, the indicator component releases thiol or its by-products when the substrate surface on which the temperature sensitive coating is applied reaches 71° C. or above. Particularly, when the temperature reaches the critical release temperature of approximately 71° C., the bond between the copper carrier and the ethanethiol is broken (i.e. the organometallic compound decomposes) and as a result volatile thiol compound(s) such as ethanethiol, organic disulfide, organic sulfide, or other sulfur-based by-products of ethanethiol may be released into the atmosphere around the substrate surface. The sulfur-based volatile gas can be detected by a thiol sensor that is positioned in the vicinity of the substrate surface, and the detection of sulfur-based gas by the sensor acts as an alert that there is a significant increase in temperature of the substrate surface that is indicative of the approach of a thermal runaway or other overheating event. The thiol release function increases as the temperature rises above 71° C., continuously alerting the system for thermal runaway events. Further, the organometallic copper ethanethiol compound visually shows the location of a thermal runaway events by changing color from light brown to dark brown (or color changes from green to dark green). The organometallic copper ethanethiol compound may also vary in appearance depending on the environment. For example, under an ambient environment, it may change color from light brown to dark brown and then to green. However, the organometallic copper ethanethiol compounds remain the same (light brown) under oxygen-free or vacuum environments. Nevertheless, the thiol releasing activity remains the same despite the presence or lack of color alteration. Therefore, the temperature sensitive coating provides at least a two-way indication of a thermal runaway event: (a) release thiol when temperature increases, alarming a warning system, and (b) color change indicating the exact location where the thermal runaway event took place. Also, as mentioned above, the temperature sensitive coating may provide a third indication of thermal runaway, namely an odor detectable by smell.

In other embodiments, the indicator component is of the encapsulation type and the carrier is a poloxamer (i.e., a block co-polymer such as a Pluronic® polymer), particularly a block co-polymer attached to a polymer nanoparticle and the releasable compound sequestered in a hydrophobic domain of the block co-polymer. Poloxamers include hydrophilic polyethylene oxide (PEO) and hydrophobic polypropylene oxide (PPO) arranged in an A-B-A triblock structure (PEO-PPO-PEO). The polymer nanoparticle provides a surface on which the block co-polymer can be attached to form an exterior, temperature-sensitive collapsible pocket. More particularly, the block co-polymer is functionalized at its ends for attachment to the polymer nanoparticle, and multiple block co-polymer chains attached to the nanoparticle form a pocket region there between in which the releasable compound can become trapped. The releasable compound may also be functionalized to aid in trapping/sequestering the releasable compound between the block co-polymers. Upon heating, the block co-polymer chains attached to the nanoparticle contract, which decreases the volume of the pocket region formed by the block co-polymers and forces/squeezes the releasable compound out of the pocket region as shown schematically in FIG. 1. In some embodiments, alkyne-functionalized thiol-based small molecules may be used as the releasable compounds, and these thiol compounds are encapsulated or otherwise tethered to functionalized temperature-sensitive poloxamer chains attached to poly(propargyl acrylate) particles.

The temperature sensitive coating may include only one of the indicator components described above. However, the temperature sensitive coating is not so limited and may include more than one (a blend of) species of indicator component, for example two different thiolated organometallic compounds such as a mixture of a short-chain copper thiol complex and a long-chain copper thiol complex. In other examples, the temperature sensitive coating may also include more than one type of indicator component, such as one thiolated organometallic compound (having a tethered releasable compound) and one block co-polymer nanoparticle (having an encapsulated or trapped releasable compound). Hence, a number of mixtures and combinations of carriers and releasable compounds may be included in the temperature sensitive coating, diversifying the tunability of the coating composition. In other words, by including a mixture of different indicator components, the temperature sensitive coating may be tuned to have a response over a wider range or number of ranges of temperatures.

The temperature sensitive coating may further contain a vehicle for the indicator component. In some embodiments, the vehicle is a solvent such as ethanol, and the indicator component such as a thiolated organometallic copper complex may be dispersed in the solvent which can then be applied to a surface. In other embodiments, the indicator component may be included as an additive to a paint composition, either during production of the paint composition or as a supplemental additive to an existing paint composition. For example, the indicator component such as nanoparticles with attached block co-polymer encapsulating a thiol may be mixed into a paint composition for application onto a surface. In yet other embodiments, the indicator component may alone constitute the temperature sensitive coating and can be directly applied to a surface.

In specific embodiments, the temperature sensitive coating may be applied to an outer surface of an energy storage system (ESS), such as to an outer surface of a battery cell or other similar substrate surface. By outer surface, it is meant that the surface is exposed to an open volume of space in which a detection sensor may be positioned to detect gaseous releasable compound that is released into the open volume of space. The open volume of space may be the ambient environment surrounding the energy storage system, or may be an internal volume. As such, the outer surface may be on the inner side of a compartment such as a housing, but is not an inner surface that is not in contact with an open, unencumbered volume of open space. In other alternatives, the temperature sensitive coating may be applied to a surface of any other device or system in which an elevation in temperature of the surface may be indicative of the onset of a critical overheating event, including any electric power component such as a circuit breaker, a furnace, a boiler, and the like. Continuing with the example of the application surface being an outer surface of a battery cell or battery cell pack, the temperature sensitive coating may be applied over the entire outer surface of the battery cell, or may only be applied to targeted areas of the outer surface such as those areas that are the most susceptible to an increase in temperature due to an overheating condition. Also, the temperature sensitive coating may be applied during the manufacturing of the battery cell, or instead may be an "aftermarket" application that is applied after fabrication of the battery cell, such as when the battery cell is installed for use.

Optionally, a protective layer may be applied on top of the temperature sensitive coating layer. For example, while the temperature sensitive coating may adhere well to the outer surface of the battery cell, the temperature sensitive coating may be overcoated with commercially available paint or other similar overcoat to further protect the temperature sensitive coating from possible scratching or peeling during handling. The protective layer simply needs to be semi-permeable so that the releasable compound of the temperature sensitive coating can permeate through the protective layer so that it reaches an airborne environment in which it can be detected. The protective layer may be included as needed, such as when the temperature sensitive coating may be exposed to greater wear conditions.

A method of detecting the onset of thermal runaway of an ESS or excessive increase in temperature of other systems includes positioning a gas sensor (such as but not limited to a thiol sensor) in the vicinity of the system component on which the temperature sensitive coating is applied. The gas sensor is not particularly limited and need only be capable of detecting small amounts of the releasable compound such as on the order of parts per million (ppm). Any available gas detection technique may be utilized for the gas sensor. The gas sensor is either continuously or periodically monitored (e.g., once a second, once every five seconds, once a minute, etc.), and an alarm is triggered by a controller or similar when the output of the gas sensor indicates the ambient presence of the releasable compound in a gaseous state. The alarm may be an auditory alarm (e.g., siren, horn, a verbal message, etc.), a visual alarm (e.g., flashing light, a legible message, etc.), or an electric (analog or digital) signal that is transmitted to a local or remote detection system via a network or similar means. The signaling of the alarm indicates that (a portion of) the system being monitored has elevated in temperature and reached the critical release temperature. As is apparent from the foregoing discussion, the method of detection may be applied to a variety of applications including battery bank temperature monitoring of energy storage systems, battery temperature monitoring of electric vehicles, temperature monitoring of electrical equipment and power stations, temperature monitoring of engines and furnaces, and temperature monitoring of reactors.

EXAMPLES

The present temperature sensitive coating and method of thermal-increase detection is further described in connection with the following laboratory examples, which are intended to be non-limiting.

Figure 2:
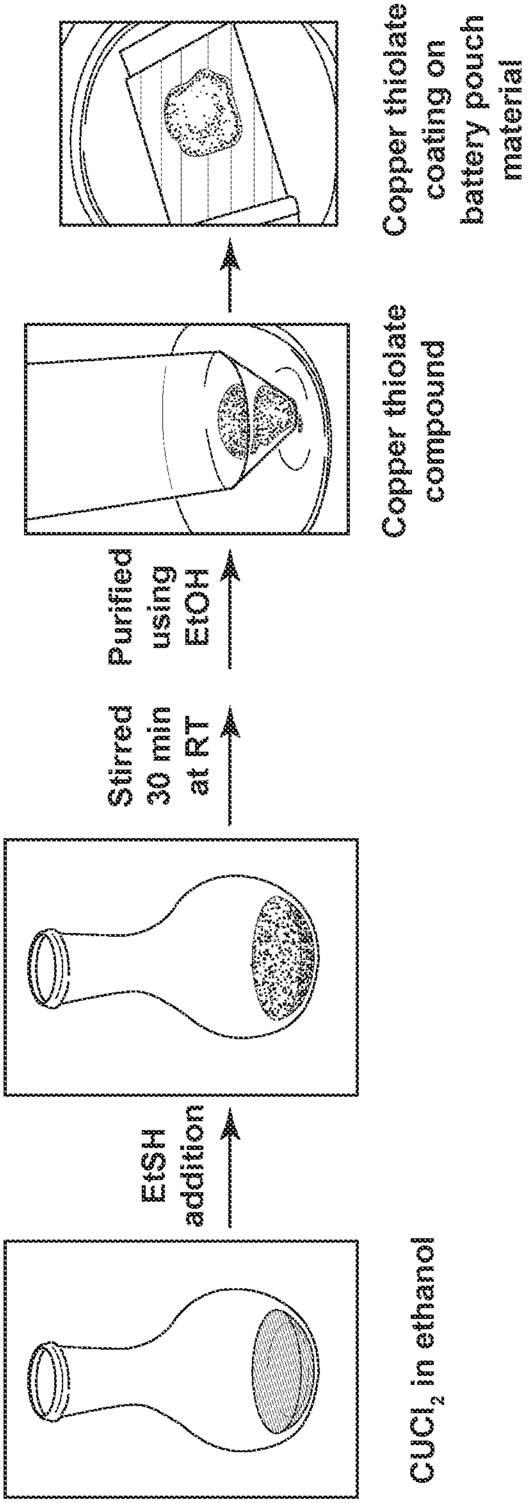
FIG. 2 is a schematic illustration of a method of forming a temperature sensitive coating including an organometallic material in accordance with some embodiments of the disclosure, and coating the temperature sensitive coating onto a surface.

As shown schematically in FIG. 2, a thermal-sensitive organometallic copper compound was synthesized according to the following method. A $CuCl_2$ (1 mmol/170 mg) was dissolved in ethanol (50 mL) and stirred for 10 min to dissolve the solid completely. Then, ethanethiol (2 mmol/162 μL) was added to the solution and further stirred for 30 minutes. The solution changed color from green to white with the addition of the thiol, indicating the formation of copper thiol compounds, and the color of the solution gradually turned to light brown after 30 minutes of stirring. Then, the product was centrifuged and washed with ethanol several times to remove any by-products. Next, the product was vacuum dried at room temperature to remove excess solvents. Subsequently, the organometallic copper complex was dispersed in ethanol solution and applied onto a battery pouch as a temperature sensitive coating. The coating adhered well onto the battery pouch surface without cracking or peeling while producing a well-dispersed and adhesive layer.

Figure 3:
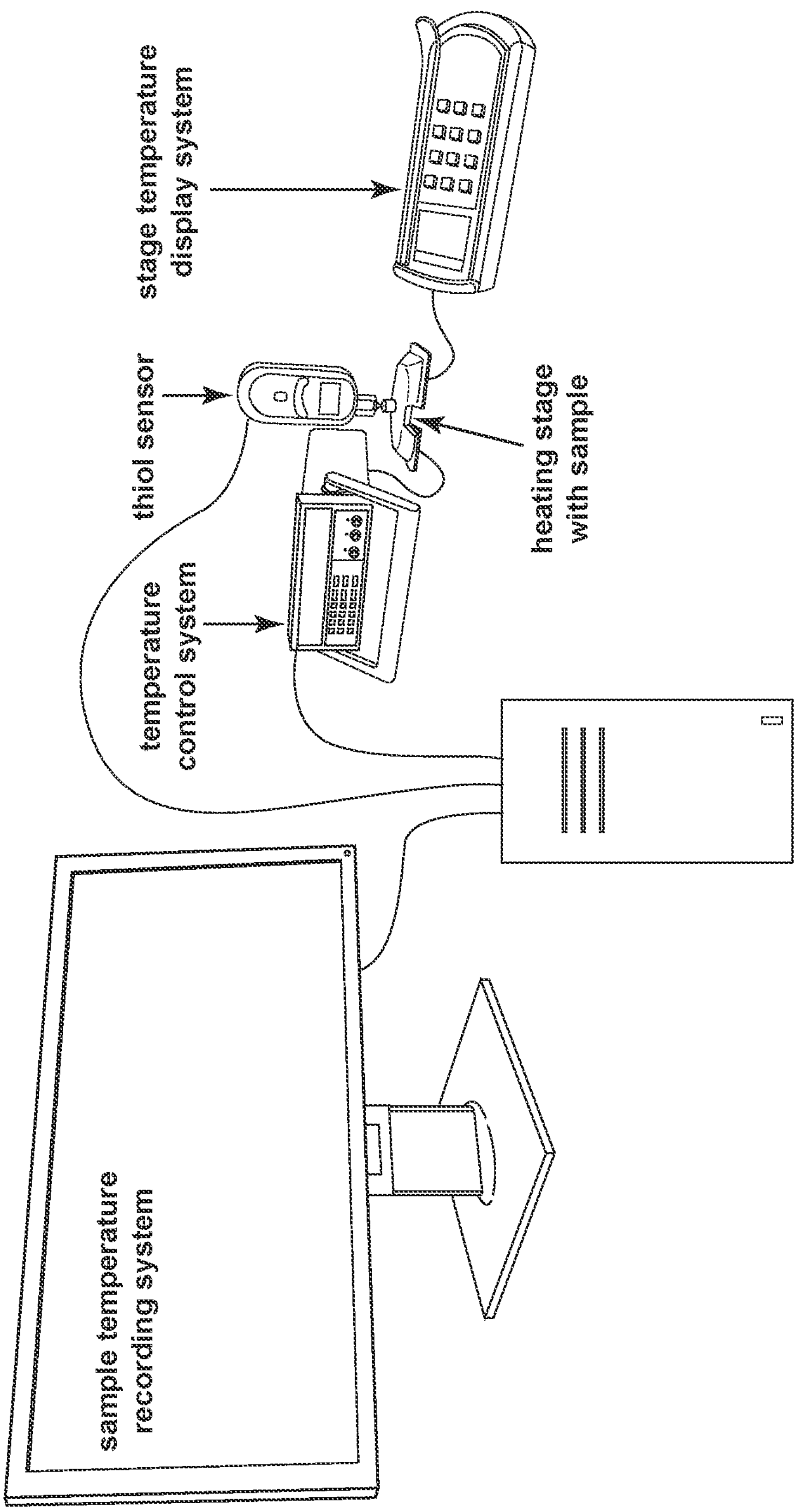
FIG. 3 is a schematic illustration of a method of detecting the approach of thermal runaway in accordance with some embodiments of the disclosure.

The thiol release activity of the temperature sensitive coating on the battery pouch was then examined. The experiment setup used for testing the temperature sensitive coating's response to thermal runway events is illustrated in FIG. 3. A ceramic heating stage was used to heat the battery pouch with the temperature sensitive coating and to heat a battery pouch without the temperature sensitive coating. The thiol releasing function of the coated battery pouch materials were tested at different heating rates to simulate fast and slow thermal runway events. All the tests were conducted in a fume hood, which had a recommended airflow of 25 CFM per interior square foot of work area.

Figure 4:
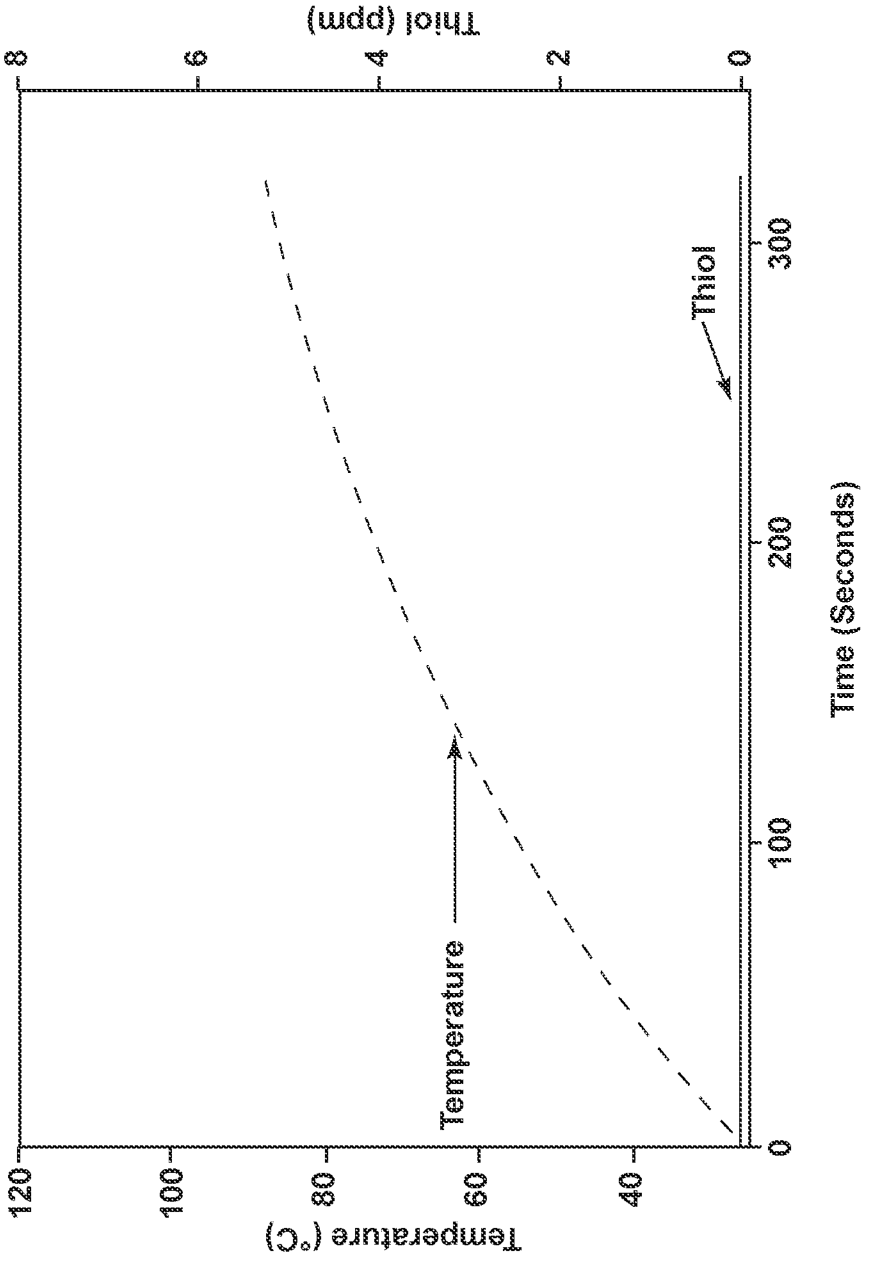
FIG. 4 is a graph of substrate temperature and detected gaseous thiol as a function of time for a substrate on which the temperature sensitive coating is absent.

Initial thiol detection tests were conducted using a battery pouch foil (no coating) as a baseline, with a temperature ramping rate of approximately 18° C. per minute. The test results are shown in FIG. 4. The X-axis represents the time in seconds. The Y-axis on the left indicates the temperature of the battery pouch foil in Celsius, and the Y-axis on the right indicates the release/detection of thiol in parts per million (ppm). As expected since no coating was applied to the bare battery pouch foil, no thiol release was observed for the battery pouch up to 88° C.

Figure 5:
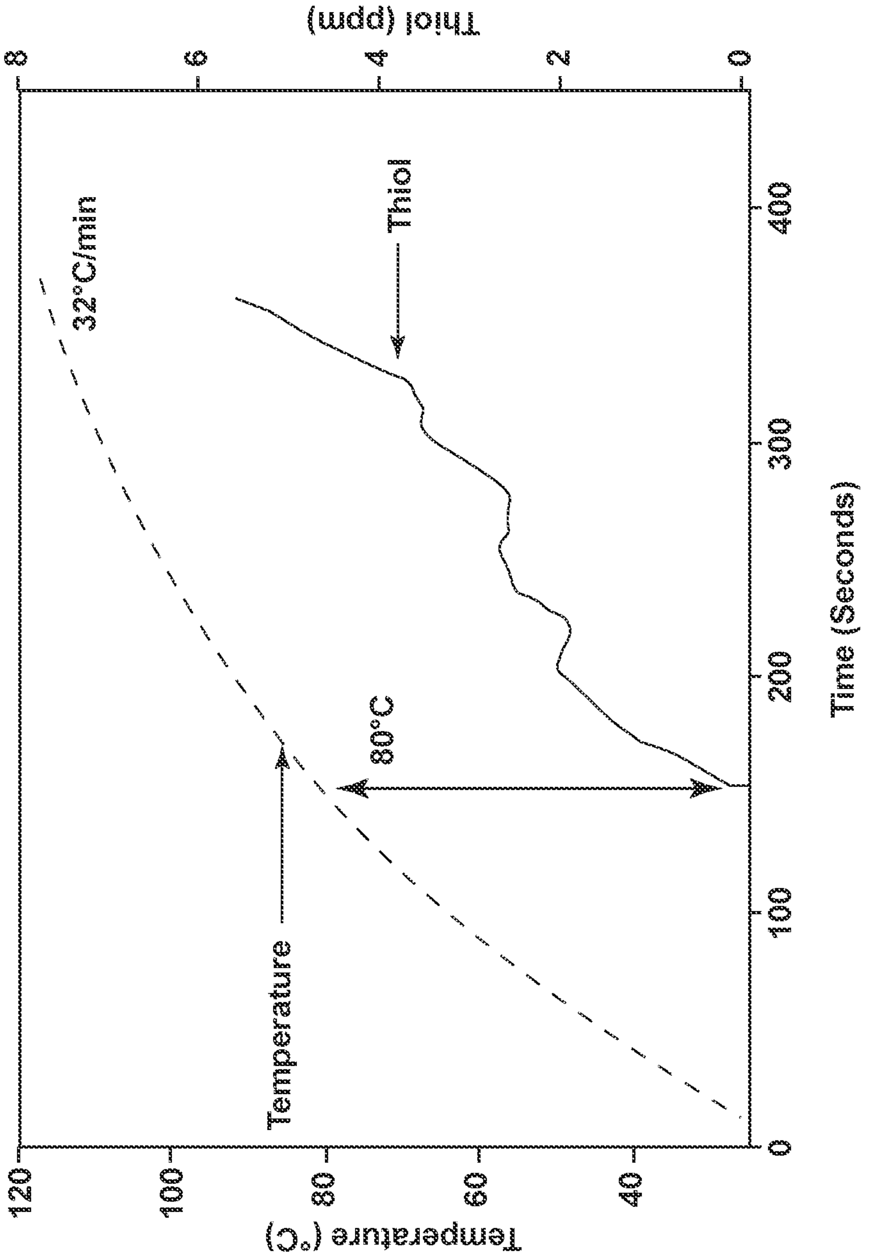
FIG. 5 is a graph of substrate temperature and detected gaseous thiol as a function of time for a substrate on which the temperature sensitive coating is applied.

Next, a fast thermal runaway event was simulated on a coated battery pouch foil. A battery pouch foil was coated with a thin layer of the temperature sensitive coating by drop-casting an ethanol solution of the thermal-sensitive organometallic copper compound synthesized as discussed above. The coating was allowed to air dry for a few minutes, during which the compound formed a well-dispersed coating on top of the battery pouch foil. Then the sample was subjected to vacuum drying overnight to further remove the solvent and to produce a compact coating layer on the battery pouch foil. Next, the battery pouch foil was fixed to a ceramic heating stage using copper tape. A temperature sensor was positioned on the battery pouch foil close to the coating using copper tape. The temperature sensor captured the temperature of the battery pouch foil and converted it to a plot of temperature vs. time using a temperature recording system. A thiol sensor was positioned above the battery pouch foil to detect the release of thiol. The thiol sensor was capable of detecting gaseous thiol concentrations in ppm as a function of time. The detection range of the thiol sensor was 0.3-100 ppm. Fast temperature ramping of nearly 32° C. per minute was achieved by supplying 19V to the heating stage. This heating rate was roughly calculated based on how long it would take to heat a sample foil to 80° C. After heating the coated battery foil pouch to approximately 118° C., the color of the coated copper ethanethiol complex indicator component changed from light brown to dark brown, visually indicating the decomposition of the copper complex. FIG. 5 shows the temperature and thiol releasing plot as a function of time. The thiol sensor began to detect the released ethanethiol compound at 80° C., and ethanethiol continued to be released as the temperature increased. The experiment was stopped after the system reached approximately 120° C. Observed fluctuations in the thiol detection might have been due to disturbances caused by the continuous airflow in the fume hood. Post-examination of the battery pouch foil does not show harmful interaction or reaction with the battery pouch materials even after the heating to 120° C.

Figure 6:
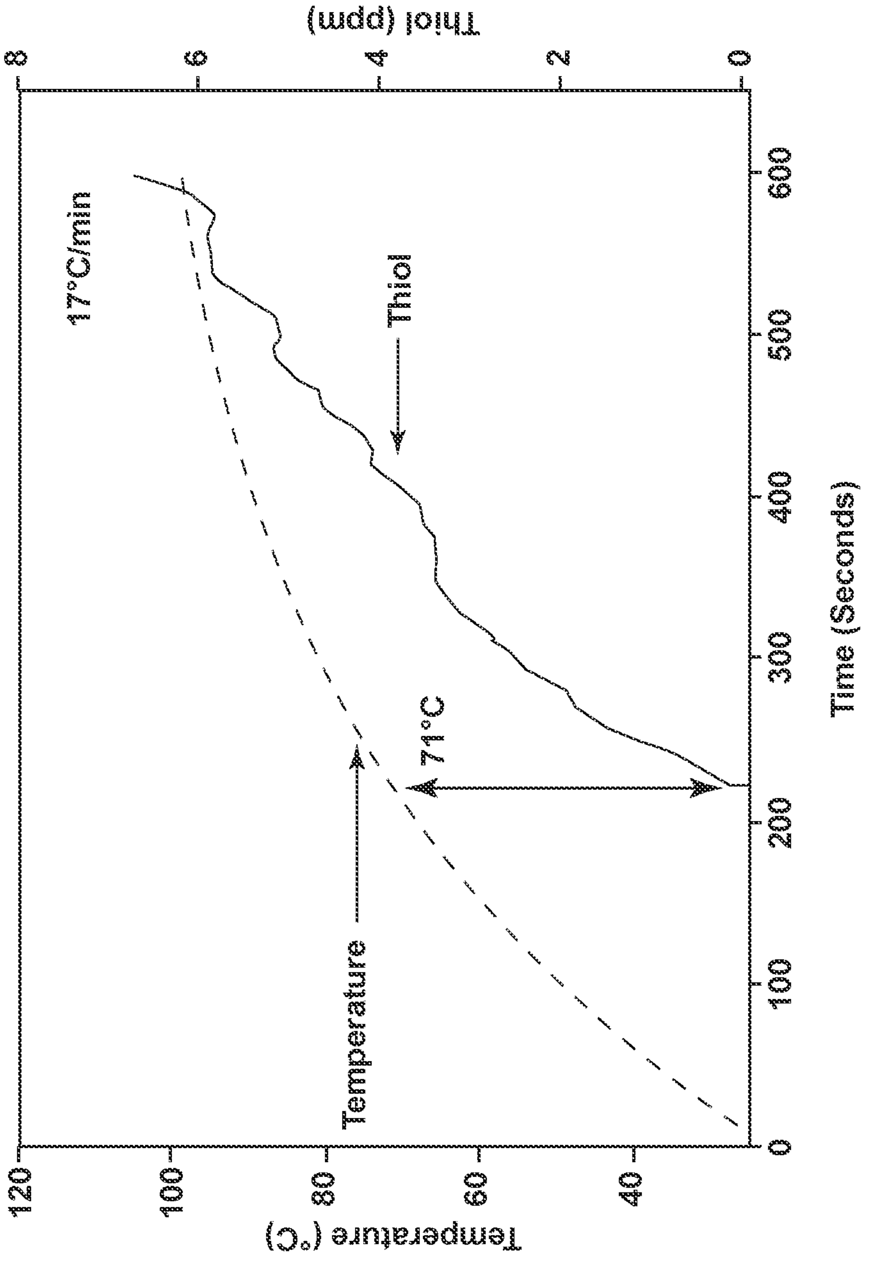
FIG. 6 is another graph of substrate temperature and detected gaseous thiol as a function of time for a substrate on which the temperature sensitive coating is applied.

A slow thermal runaway event was then simulated by decreasing the temperature ramping to approximately 17° C. per minute (by applying 15V to the heating stage). As shown in FIG. 6, in this case thiol detection started at 71° C. and the thiol release continued as the temperature increased. The experiment was stopped after the system reached approximately 100° C. Similar to the fast thermal runaway test, the color of the coated copper ethanethiol complex indicator component changed from light brown to dark brown during the slow thermal runaway event as well.

Figure 7:
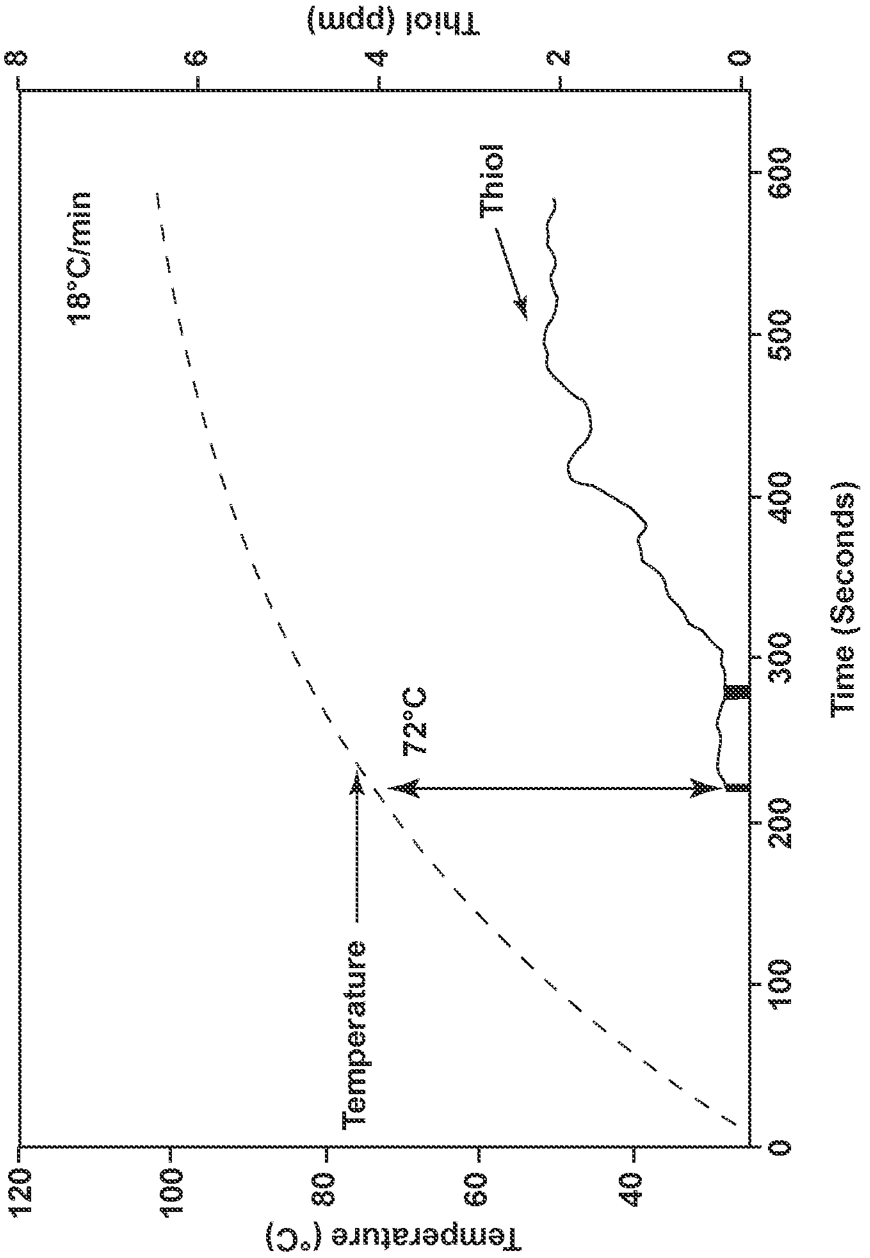
FIG. 7 is a graph of substrate temperature and detected gaseous thiol as a function of time for a substrate on which the temperature sensitive coating is applied, and a protective coating is applied over the temperature sensitive coating.

Next, overcoating of the temperature sensitive coating was tested. A battery pouch foil was coated with a thin layer of the organometallic copper compound temperature sensitive coating in the same manner as above. The temperature sensitive coating was then overcoated with a conductive silver paint as an additional protective layer. The overcoated battery pouch foil was fixed to a ceramic heating stage using copper tape, and a temperature sensor was positioned on the battery pouch foil close to the coating using copper tape. The temperature ramping rate was set to approximately 18° C. per minute to simulate a slow thermal runaway event. As shown in FIG. 7, the temperature sensitive coating, while overcoated with the conductive silver paint, still responds to the thermal runaway event, with thiol release initiated at approximately 72° C. and continuing as the temperature increased until the experiment was ceased at approximately 100° C. The amount of detected thiol was about half that observed during the slow thermal runaway event without the overcoating, but the level of thiol release was still sufficient for noticeable detection.

The selection of both metals and thiol compounds are essential for designing the temperature sensitive coatings for various applications such as energy storage system (ESS) application. Organometallic compounds with long hydrocarbon chains or elements with strong metal-thiol interaction may or may not be suitable for sensing thermal runaway events below 120° C. but could be suitable for other applications in higher temperature ranges, as shown by the following examples.

To show the effects of different thiol compounds, organometallic silver dodecanethiol compounds did not release thiol when heated up to 120° C. in the same manner as described above. Typically, a thiol with a long hydrocarbon chain like dodecanethiol required a temperature above 200° C. to decompose the organometallic compound and initiate thiol release due to its high boiling point (BP=270° C.). Further, the synthesis of a copper compound with 4-tert-butylbenzyl mercaptan did not produce stable copper-thiol products.

To show the effects of varying the metal in the organometallic complexes, organometallic silver ethanethiol compounds were synthesized. Upon heating in the same manner as above, the organometallic silver ethanethiol compounds did not release thiols when heated to 120° C. Nickle ethanethiol compounds did not produce a solid-state suspension that could be applied as a coating over a battery pouch foil. Therefore, organometallic compounds with strong metal-thiol interaction such as silver or palladium might not be suitable for sensing thermal runaway events that are below 120° C.

Thiol modified nanoparticles (NPs) also could be used as the indicator component of a temperature sensitive coating. However, dodecanethiol modified palladium NPs, dodecanethiol modified nickel NPs, and dodecanethiol modified palladium/silver blend NPs did not release thiol when heated up to 120° C. Therefore, thiol modified nanoparticles with strong metal-thiol interaction such as silver or palladium may not be suitable for sensing thermal runaway events below 120° C.

Figure 8:
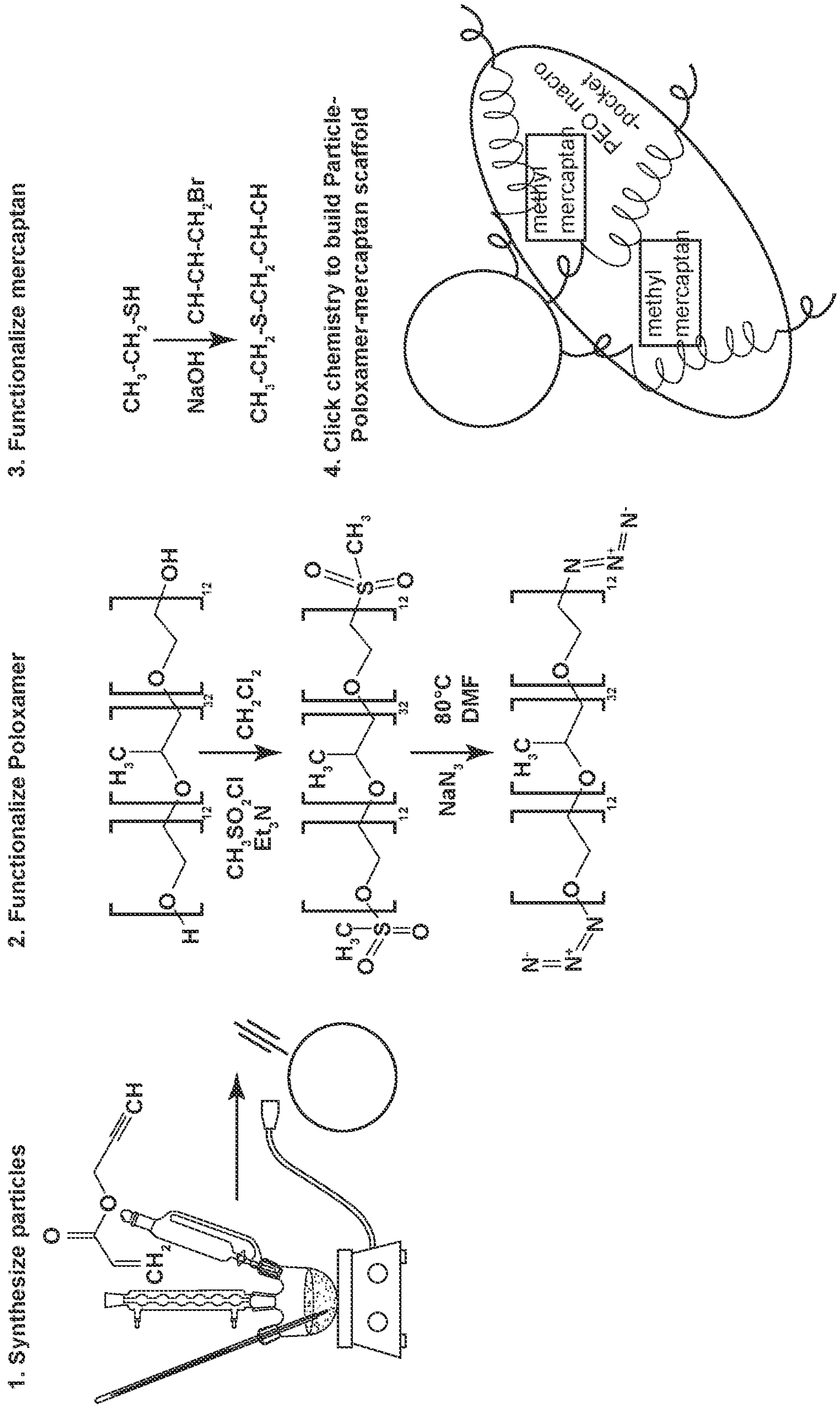
FIG. 8 is a schematic illustration of a method of forming a temperature sensitive coating including a block co-polymer in accordance with some embodiments of the disclosure.

Furthermore, a thiol-embedded polymer nanoparticle was synthesized as an indicator component of a temperature sensitive coating, namely a thiol encapsulated in an arrangement of block co-polymers attached to a polymer nanoparticle. Synthesis of polymeric nanoparticles and functionalizing of poloxamers to attach functionalized thiol compounds is a stepwise process as illustrated in FIG. 8. As described in greater detail below, the synthesis process includes: (1) synthesis of poly (propargyl acrylate) particles; (2) functionalization of poloxamer molecules; (3) azide/alkyne functionalization of mercaptan molecules; and (4) click reaction to attach/combine thiol into polymer/or polymeric nanoparticles.

(1) Synthesis of poly (propargyl acrylate) particles: poly (propargyl acrylate) (PA) particles were prepared by an emulsion polymerization method. DI water (225 mL) was added to a three necks round bottom flask and purged with nitrogen for 2 hours. Sodium dodecyl sulfate (0.15 g, in 6 mL water) was added to the flask and heated to 71° C. Propargyl acrylate (27 mL), divinylbenzene (0.87 mL), and potassium persulfate (0.3 mg in 15 mL water) were added dropwise and stirred for 2.5 hours. After cooldown, the product was purified by dialysis using a Spectra/Por Dialysis membrane (MWCO 50 KD) for 14 days at 60-70° C. while replacing the water twice a day.

(2) Functionalization of Pluronic® polymer (poloxamer): Pluronic L64 (10 g) was dissolved into dry dichloromethane (DCM, 32 mL) in a round bottom flask. Triethylamine (0.768 g, 1.057 mL) followed by methanesulfonyl chloride (0.869 g, 0.587 mL) was added dropwise to the mixture. The mixture was stirred overnight to complete the reaction at room temperature (RT). The product was washed with water and extracted to DCM, and dried with $Na_2SO_4$ to remove any trace of water. The solvent was removed by rotary evaporation, resulting in viscous $MeSO_2$-Pluronic-$MeSO_2$ molecules. For the next step, $MeSO_2$-Pluronic-$MeSO_2$ (2 g) in dry DMF (10 mL) was mixed with $NaN_3$ (0.344 g) in a round bottom flask and heated to 80° C. for 3 hours. The final product was washed with water, extracted with DCM, and dried with $Na_2SO_4$ to remove any trace of water. The solvent was removed by rotary evaporation, resulting in viscous $N_3$-Pluronic-$N_3$ molecules.

(3) Alkyne functionalization of mercaptan: ethanethiol (10 g, 14.5 mL), methanol (56 mL), DI water (11.6 mL), and NaOH solution (7.72 g in 12 mL DI water) were mixed in a round bottom flask at 0° C. Then, propargyl bromide (14.5 mL) was added dropwise to the mixture and stirred for 30 minutes. The product was washed with dichloromethane (DCM)/DI water mixture and extracted with DCM.

(4) Click reaction (i.e., Cu(I)-catalyzed azide-alkyne-cycloaddition (CuAAC)) to attach/combine thiol into polymer/or polymeric nanoparticles, specifically attachment of thiol to the azide-functionalized poloxamer and poly(propargyl acrylate) particles was performed using a copper(I)-catalyzed azide/alkyne cycloaddition. In general, the azide-modified poloxamer (3.72 g) was mixed with DI-water (50 mL) while stirring in a round bottom flask. Copper sulfate (0.640 g) in DI-water (5 mL) and sodium ascorbate (1.27 g) in DI-water (5 mL) were prepared for the click reaction. Then, alkyne-functionalized ethanethiol (0.064 g) was added to the poloxamer mixture. Next, copper sulfate solution (2.5 mL) was added to the mixture, followed by sodium ascorbate solution (2.5 mL), and stirred for one hour under $N_2$. This facilitated attachment of the alkyne function thiol to the azide-functionalized poloxamer via click reaction. After 1 hour, poly(propargyl acrylate) particles (12 g) were added to the mixture, and the rest of the copper sulfate and sodium ascorbate solution was added to the reaction mixture. The reaction continued overnight. Then the product was washed with DI water/ethanol/acetone and ethylenediaminetetraacetic acid (EDTA) to remove any unreacted byproducts. The product was stored in a bottle with a small amount of DI water.

Figure 9:
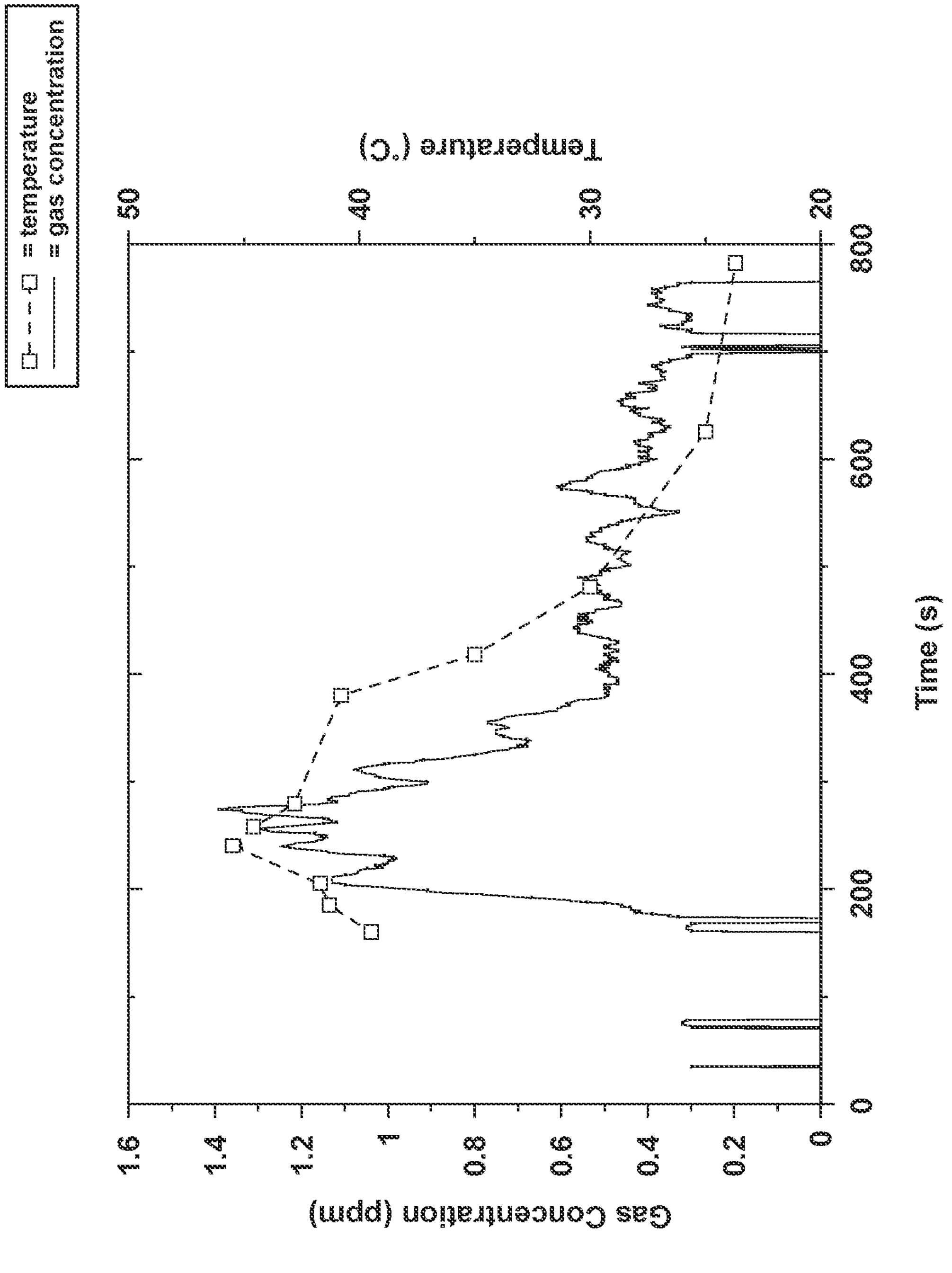
FIG. 9 is a graph of temperature and thiol (mercaptan) gas release from the block co-polymer of FIG. 8 as a function of time.
Figure 10:
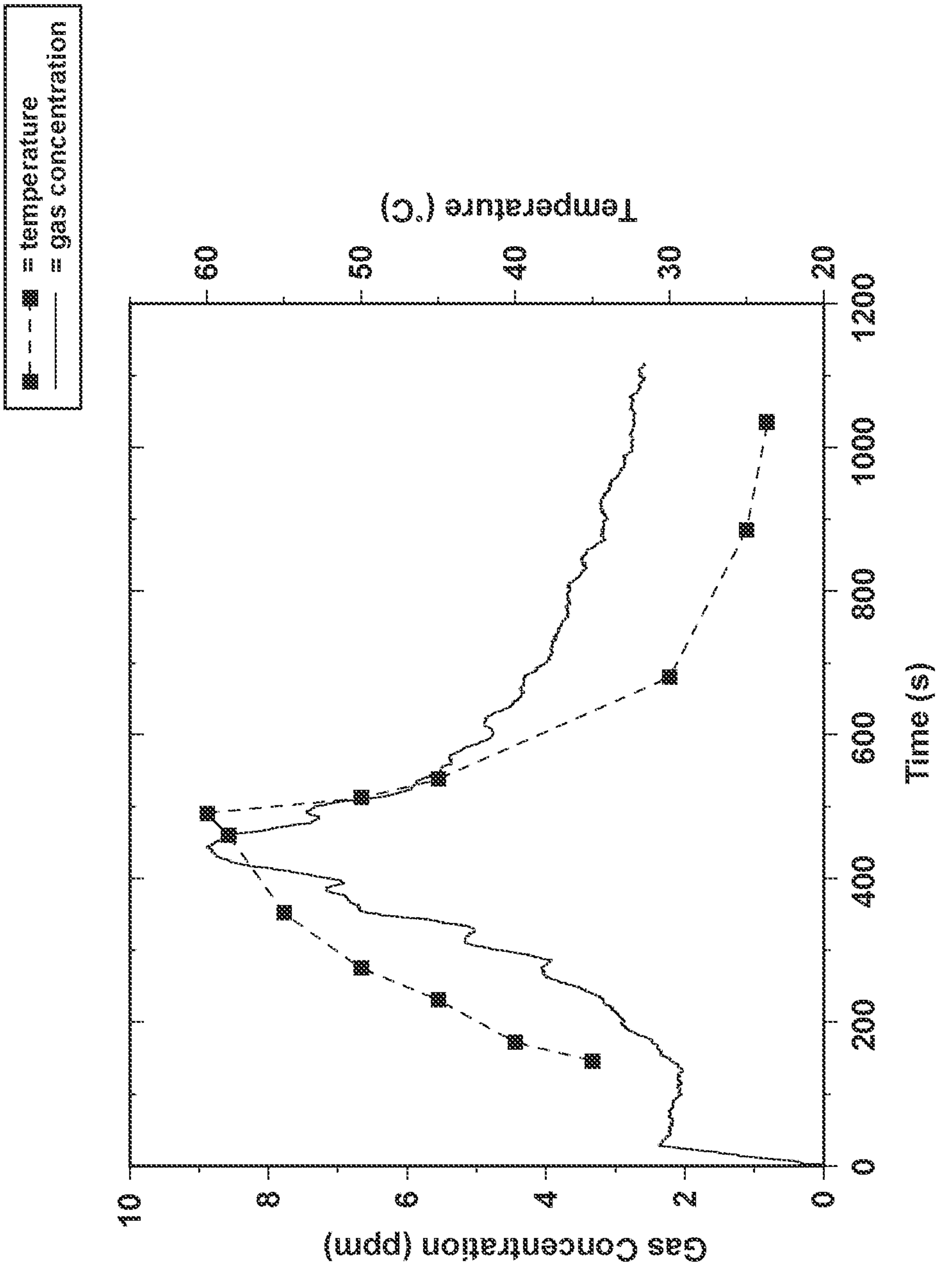
FIG. 10 is a graph of temperature and thiol (mercaptan) gas release from the block co-polymer of FIG. 8 mixed with oil, as a function of time.

As shown in FIG. 9, the obtained thiol-embedded poloxamer (block co-polymer) nanoparticles had a detected thiol release in the range of 1.0 to 1.4 ppm at a temperature in the range of 40° C. to 45° C. during a heating and cooling cycle between room temperature and 45° C. Further, the obtained thiol-embedded block co-polymer nanoparticles were mixed with oil as a vehicle for the particles. First, the pure polymer was placed in a container and set on a hot plate with temperature control. An increase in mercaptan concentration was detected in the temperature range of 45° C. to 60° C. The polymer was then mixed with coconut oil and showed consistent release of the trapped mercaptan molecules in the same temperature range. A systematic study was carried out using various polymer-to-oil ratios. An example of the gas release is shown in FIG. 10, in which the peak temperature of 58° C. during the heating and cooling cycle corresponds with the maximum gas concentration of 9 ppm.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A temperature sensitive coating for application on a surface, the temperature sensitive coating comprising:
an indicator component including:
a carrier; and
a releasable compound that is held by the carrier, the releasable compound being in a gas state at a critical release temperature;
wherein the indicator component is an organometallic compound in which the releasable compound is bonded to the carrier, the indicator component having a chemical formula $M_x(S—R)_y$, in which M is the carrier and represents a transition metal, R represents a hydrocarbon, S—R is the releasable compound, x is an integer having a value of 1, 2, 3, or 4, and y is an integer having a value of 1, 2, 3, or 4;
wherein the releasable compound is released from the carrier at a temperature that is at or above the critical release temperature.

2. The temperature sensitive coating of claim 1, wherein the bond is broken at the critical release temperature to release the releasable compound.

3. The temperature sensitive coating of claim 1, wherein the releasable compound is one selected from a group consisting of a sulfur-containing compound, an aliphatic thiol, an aromatic thiol, mercaptan, an alcohol, a ketone, and ammonia.

4. The temperature sensitive coating of claim 1, further including a vehicle.

5. The temperature sensitive coating of claim 4, wherein the vehicle is a solvent.

6. The temperature sensitive coating of claim 1, including a plurality of different indicator components.

7. The temperature sensitive coating of claim 1, wherein the critical release temperature is in the range of 60° C. to 140° C.

8. A method of coating a surface of an energy storage system, the method comprising:
providing the temperature sensitive coating of claim 1; and
applying the temperature sensitive coating to an outer surface of the energy storage system.

9. The method of claim 8, wherein the temperature sensitive coating is applied to one of: (i) an entire outer surface of the energy storage system; and (ii) only to targeted areas of the outer surface of the energy storage system.

10. The method of claim 8, further comprising the step of applying a protective layer over the temperature sensitive coating.

11. The method of claim 8, wherein the temperature sensitive coating is applied at one of: (i) during fabrication of the energy storage system; or (ii) after fabrication of energy storage system.

12. A method of detecting the approach of thermal runaway of an energy storage system, the method comprising:
coating a surface of the energy storage system with the temperature sensitive coating of claim 1;
providing a gas sensor in the vicinity of the energy storage system, the gas sensor being capable of detecting the presence of the releasable compound;
monitoring an output of the gas sensor; and
signaling an alarm when the gas sensor output indicates the presence of the releasable compound;
wherein the signaling of the alarm indicates that the energy storage system has reached the critical release temperature.

13. The method of claim 12, wherein the energy storage system includes a battery cell.

14. The method of claim 12, wherein the step of coating the surface of the energy storage system is performed at one of: (i) during fabrication of the energy storage system; or (ii) after fabrication of energy storage system.

15. The method of claim 12, including the step of over-coating the temperature sensitive coating with a protective layer.

16. The method of claim 15, wherein the protective layer comprises a paint.

17. The method of claim 12, wherein the temperature sensitive coating changes color at the critical release temperature, and a location of the change in color of the coating indicates an area of elevated temperature that is at or above the critical release temperature.

18. A temperature sensitive coating for application on a surface, the temperature sensitive coating comprising:
- an indicator component including:
  - a carrier; and
  - a releasable compound that is held by the carrier, the releasable compound being in a gas state at a critical release temperature;
- wherein the releasable compound is released from the carrier at a temperature that is at or above the critical release temperature;
- wherein the carrier includes a block co-polymer in which the releasable compound is sequestered in a hydrophobic domain of the block co-polymer.

19. The temperature sensitive coating of claim 18, wherein the releasable compound is one selected from a group consisting of a sulfur-containing compound, an aliphatic thiol, an aromatic thiol, mercaptan, an alcohol, a ketone, and ammonia.

20. The temperature sensitive coating of claim 18, wherein the critical release temperature is in the range of 60° C. to 140° C.

* * * * *